Oct. 27, 1970 YOSHITAKA NAKANISHI 3,536,366
ROLLER
Filed June 24, 1968
2 Sheets-Sheet 1
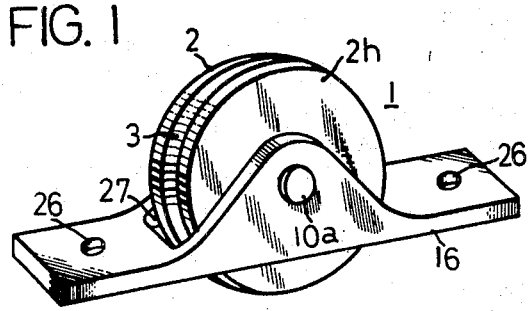
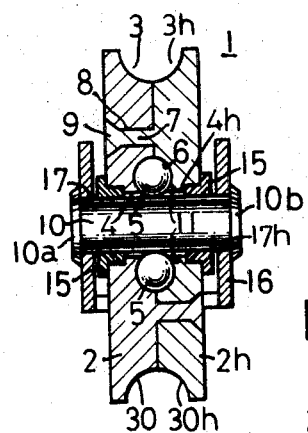
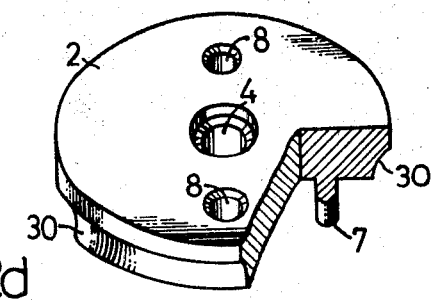
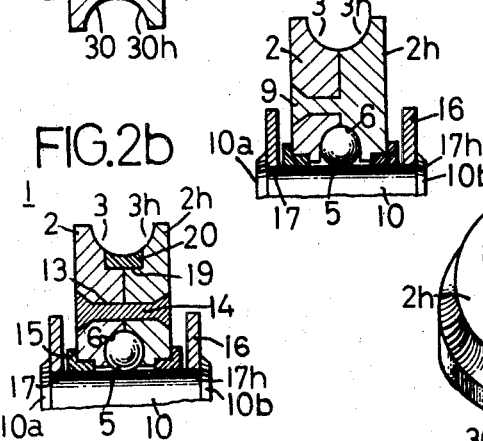
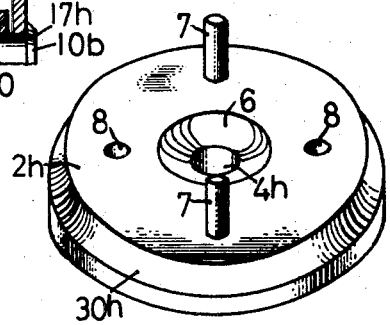

Oct. 27, 1970  YOSHITAKA NAKANISHI  3,536,366
ROLLER
Filed June 24, 1968  2 Sheets-Sheet 2
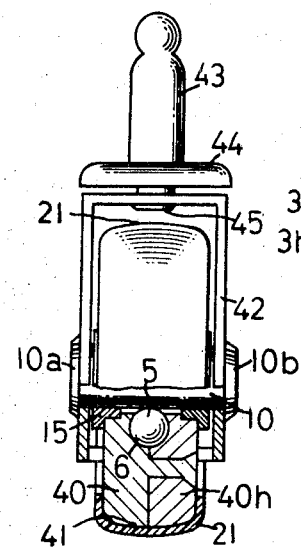
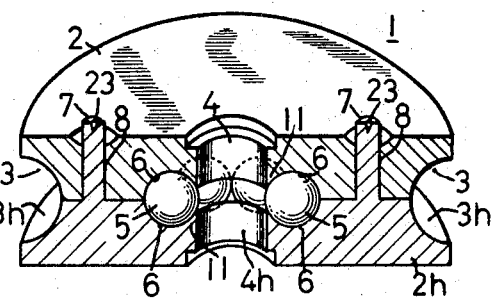
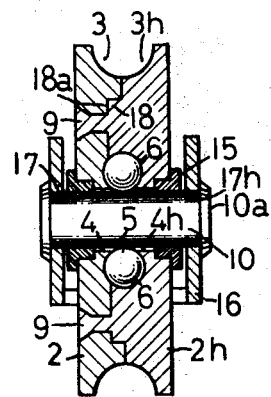
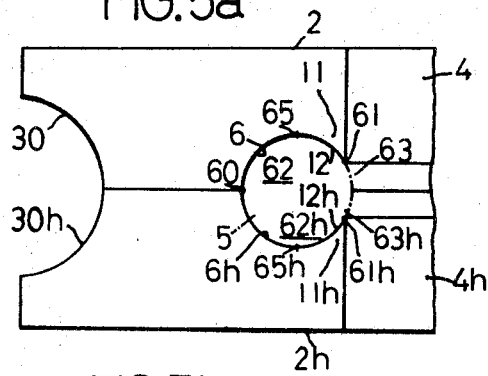
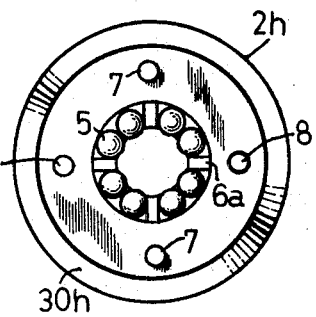
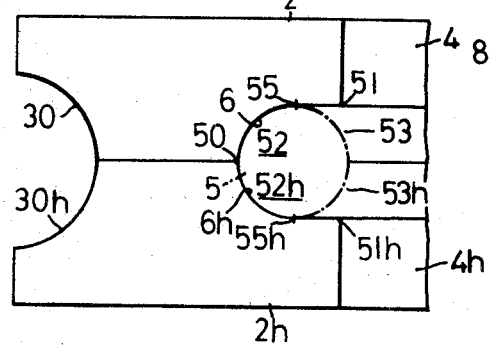

United States Patent Office 3,536,366
Patented Oct. 27, 1970

3,536,366
ROLLER
Yoshitaka Nakanishi, 12–9, 5-chome, Yawata,
Ichikawa-shi, Chiba-ken, Japan
Filed June 24, 1968, Ser. No. 739,513
Claims priority, application Japan, June 24, 1967,
42/40,255; June 26, 1967, 42/54,507
Int. Cl. F16c 17/04, 33/00
U.S. Cl. 308—35                                          3 Claims

ABSTRACT OF THE DISCLOSURE

A roller comprising two halves divided at a plane normal to the axis of the roller, each half having a center aperture in the axial direction, and an annular groove opening into the aperture, to mate with the annular groove of the other half, thereby providing a race for a plurality of ball bearings. A flexible self-lubricating bushing is disposed within the aperture of the roller halves, in contact with the ball bearings to rotate freely therein.

---

This invention relates to an improved roller and, more specifically to a novel roller used for a sliding door, a sash door, a paper door, a movable stack, a movable platform, portable furniture, a building member, and a structural member, etc.

Various conventional techniques are known for providing smooth operating rollers for sliding doors, etc. In one such device, an oilless brush between the roller body and the shaft, and the ball bearing device combined therewith. But as these known articles are generally manufactured by pressing the plate member, the assemblage is liable to be loosened, thereby resulting in an inoperable device.

One object of this invention is to offer a novel roller which rotates smoothly in such a way that it can lightly move the above-described articles.

Another object of this invention is to offer such a roller which is also economical to manufacture, and in which the race serves both to embrace the bearing balls and to become the retainer.

Still further, another object of the present invention is to produce a wheel structure which is strong and reliable.

In order to attain the various objects described above, the roller according to a present invention consists of the solid material divided into halves at a plane normal to the axis, and forms the combined body of a part having a center aperture passing through the axis thereof, each half being provided with an annular groove formed around the periphery of the center aperture for cooperating with the other half to hold the bearing ball and to meet each other, each center aperture being common in the axial direction, the annular groove has the opening area meeting to the center aperture. In the present invention, the edge of each center aperture extends in the axial direction in such a way that it embraces the bearing balls to hold them in place.

The accompanying drawings illustrate the invention. In such drawings:

FIG. 1 is a perspective view of the roller unit for a sliding door panel embodying this invention.

FIG. 2a is an enlarged vertical sectional view of the embodiment shown in FIG. 1.

FIG. 2b shows a modified form of FIG. 2a in which the joining means of the roller halves are different, and the lower half thereof is omitted.

FIG. 2c is an enlarged vertical sectional view showing an example of a differently formed roller half.

FIG. 2d is an enlarged vertical sectional view showing the roller of this invention without the control edge.

FIG. 3a is an enlarged perspective view showing one of the roller halves of the roller of this invention.

FIG. 3b is an enlarged perspective view of the roller half shown in FIG. 3a, showing the other side.

FIG. 4 is an enlarged perspective view cut at the center of the roller of this invention, showing the state of the ball bearings inserted therein.

FIGS. 5a and 5b are partial section drawings for showing the relation between the annular grooves to receive the bearing balls and the bearing ball is shown by dotted line.

FIG. 6 shows a plan view of the modified FIG. 3b wherein the annular groove is divided by partition walls and the bearing balls are inserted therebetween.

FIG. 7 shows a partial section of caster embodying this invention.

Referring to FIGS. 1–3b and FIG. 7, roller 1 is the integral assemblage of roller halves 2 and 2h composed of solid metallic material. The roller halves 2, 2h are provided with the peripheral surfaces 30, 30h for rolling on a rail (not shown) and formed by annular groove 3 and 3h. The annular groove 3 and 3h and peripheral surface 30 and 30h are adjacent each other for forming one annular groove and one peripheral surface. However, when the peripheral surface 4 is intended to contact the floor as shown in FIG. 7, then no groove is provided. The roller halves have the center aperture 4 and 4h at its center for passing the shaft 10 therethrough, and the center aperture are interconnected. Annular grooves 6 and 6h for receiving bearing balls are formed starting from the edge of the center aperture 4 and 4h. Referring to the annular grooves, it may be suitable to dispose either in a series or partially along the whole periphery of the center aperture, but in FIG. 6, the annular groove is provided intermittently, and in other figures it is arranged in series.

Roller half 2 has a suitable number, for example, two, of pins 7, 7 on its inner face, and pin holes 8, 8 penetrating the roller half body, the pins and holes being disposed in a definite position with crossed relation to each the other as clearly shown in the drawing. Other roller half 2h also has pins 7, 7, and pin holes 8, 8, and, these two halves are meshed and the pin of one side is inserted into the pin hole of the other, and the head of the part extruded outward from its pin hole (accordingly, pin is made longer for accommodating thereto) is hammered and calked at the drill shaped hole 23, thus integrally connecting the two halves.

As described above, each roller half includes the connecting means and in manufactured in perfectly the same type, so that the number of particles can be decreased, but, for convenience sake, common holes 13 and 13 of each of two roller halves may be drilled, and after the pin 14 has been passed through it may be calked (FIG. 2b), or clamped by a screw (not shown).

Each roller half is preferably made of metallic material, and manufacture by die casting is especially preferable for increasing the quality and efficiency. Such materials as zinc alloy, aluminium alloy, copper alloy, magnesium alloy, tin alloy, lead alloy, or iron material or other metallic material may be used. However, the roller halves may also be made of plastic materials having the strength no less than those materials described above, for example, strengthened polyester resin, polyamid resin (nylon) etc. In this case, it may be manufactured by an extrusion process or the suitable injection process, etc. As another alternative, the rollers may be made of iron powder and other metallic powder and the synthetic resin as described above by the sintering process.

Irrespective of the material used, it has been found that the pin can be molded simultaneously as a part of the roller half.

A plurality of steel balls or the bearing balls 5 . . .

composed of strong plastic material as described above are disposed in the annular groove which retains them.

FIG. 2c shows one example of such modification. One half 2h of the roller halves forms the stepped part 18, corresponding to this part is formed the recess 18a in the other one roller half and each member is engaged by the means of these stepped parts.

In FIG. 6, the modified annular groove is shown in the plan view. Partition walls 6a . . . are disposed in many places, between these partition walls are disposed the bearing balls. Bearing balls may be disposed in the individual recess provided in the bottom of the annular groove, and these recesses can be made simply by the molding process such as die casting, etc., described above.

If desired, another groove 19 may be provided in the grooves 3, 3h in the roller half described above, for receiving a tire 20 (FIG. 2b) composed of a synthetic resin, the same as the raw material of the bush described later or the material of the rubber series.

Bushing 15 is made of self lubricating resin and is engaged in the center aperture 4 and 4h. Self lubricating resins are, for example, polyamide resin (nylon resin), Derlin resin, Fluor resin, Phenol resin, ABS resin, etc.

On assembling the roller, as one example, one of the half rollers is supported in a horizontal state, the ball bearings are placed in the annular groove, the mating roller half is placed thereon, and each member of the roller half is combined integrally by the pins and pin holes, thus, the roller halves 2 and 2h annular groove 6, 6h embrace the balls oppositely, and the center apertures 4, 4h are interconnected. This assembly is put in the hole 27 of the frame 16, the shaft 10 is passed through the center aperture 17 of the frame and center aperture of the roller and protrudes from the center aperture 17h on the opposite side of the frame, and then the head of the shaft is calked 10a, 10b. Holes 26, 26 are for passing a fastener for attaching the roller of this invention to the bottom of the door (not shown in the drawing). Further, in this case, the temporal tool such as pin may be inserted in the center aperture and may be driven out following the insertion of the shaft 10, whereby the assembling efficiency can be increased.

The example in which the control edge is formed in the annular groove is shown in each drawing figure except FIGS. 2d and 5b, and it is illustrated especially in FIG. 5a.

In the roller half 2, the sectional shape of the annular groove 6 is formed such that a line from the intersecting point of the joining face of the roller halves 2, 2h with the annular groove 6 for holding the bearing balls bearing named 60, to the intersecting point of the groove 6 with the center aperture 4 being named 61, defines a circular arc 62 from the intersecting point 60 to 61 of over nearly 90°, but less than 180° (specially see FIG. 5a). Roller half 2h too corresponds to the mark in the roller half 2, except that suffix h is added to the reference number. In this way, the annular grooves 6 and 6h in the roller halves 2 and 2h have the opening area 63 and 63h starting at the center aperture 4 and 4h. 65 and 65h show the 90° points described above.

FIG. 5b differs only in that it has no control edge. In FIG. 5b, showing the sectional shape of the annular groove 6, the intersecting point of the junction face of the roller half 2 and 2h with the annular groove 6 is designated 50, is spaced from the intersecting point of the center aperture and the tangent at the point 55 by ¼ of the entire circumference from the intersecting point 50 of the annular groove 6 being named 51. Mating roller half 2h too is the same, and suffix h is added to the mark as in the prior example. In this case, the opening area between the annular groove and the center aperture is shown by symbol 53 and 53h.

In FIG. 5a, the control edge 11 extends to the opening area adjacent to the center aperture from the point 65 of ¼ of the circular arc between the intersecting point 61 or 61h and this part embraces the ball in the center aperture in such a way that the ball may not fall.

Namely, in the part where the annular groove 6 and 6h open in the center aperture, the control edge 11 of the roller half stands up for forming an arcuate curved surface 12 and/or 12h in a curved up shape and the annular groove includes this curved surface 12 and/or 12h in its sectional form. So that, when they (shown by dotted line) are inserted in one roller half, balls are embraced by the control edge, prevented from falling down, and the mating roller half is superposed thereon and engaged and thereafter the wheel shaft may be passed through the center aperture. So that both the assemblage of the balls and the entire assembly process are simplified remarkably, and the structure becomes stronger, the rolling of the ball becomes lighter and the appearance is improved.

The end of the control edge is shown as 61, 61h, but this becomes the relation shown in FIG. 2d when the length of the circular arc from the 60 to 61 and/or 61h is about ¼ of the whole circumference, and when it is nearly ½, it is embraced perfectly and is not in contact with the wheel shaft so that it is designed such that the relation between them can be maintained. This is an example of such design.

When the balls sufficiently fill one of the roller halves excess balls flow outward and only necessary balls are charged in the annular groove sufficiently, rapidly and in safety, and held, so that mass production operations can be performed more easily.

If desired, only one of the annular grooves opposing each other in the roller halves may be assembled to include the arcuate surface of the control edge and the other may be omitted.

FIG. 7 shows a caster wherein roller halves are shown by 40, 40h, and provided with a peripheral surface 41 wrapped by the belt 21 made of synthetic resin with no groove. The annular groove 6, the ball 5 supported by the annular groove (center aperture), the shaft 10 passing through the calked part 10a, 10b of the head of the shaft the bushing 15 inserted in the center aperture, etc., are all the same as described above. Frame 42 is supported by the enlarged head 45 to the attaching portion 43, and the assembled roller half is supported by the shaft 10.

It is intended in the appended claims to cover all such changes and modifications as fall within the true spirit and scope of the invention.

What I claim is:

1. A roller comprising two joined together complementary circular roller halves, each roller half having means defining a center aperture aligned with one another and means defining an annular groove opening into the circumference of said aperture cooperative with each other to define a ball bearing race, the contiguous faces and the outer faces of each roller half being flat and the body of each said roller half between said contiguous face and the outside face being solid; a shaft inserted through said center aperture; bearing balls disposed between said annular groove and said shaft; and a bushing positioned at the periphery of the center of each aperture, the shaft being supported by said bushing, wherein said bushing is composed of a flexible self-lubricating plastic material.

2. A roller according to claim 1, wherein the shaft is attached to a frame.

3. A roller comprising two joined together complementary circular roller halves, each roller half having means defining a center aperture aligned with one another and means defining an annular groove opening into the circumference of said center aperture cooperative with each other to define a ball bearing race, each said annular groove having a circular arc in transverse section, at least one of said roller halves having a peripheral edge extending in the axial direction effective to retain bearing balls in said annular groove, a plurality of bearing balls disposed in said annular groove, a shaft inserted through said center aperture in contact with said bearing balls, a bushing of flexible self-lubricating plastic disposed on the peripheral edge of the center of each aperture, said shaft being supported by said bushing and being in contact with said bearing balls, and a frame having apertures provided therein for supporting said shaft.

References Cited

UNITED STATES PATENTS

| | | | |
|---|---|---|---|
| 78,210 | 5/1868 | Jewett | 308—190 |
| 1,046,961 | 12/1912 | Buddle | 308—190 |
| 2,805,107 | 9/1957 | Van de Worker et al. | 308—190 |
| 2,922,310 | 1/1960 | Anderson | 74—230.3 |

FRED C. MATTERN, JR., Primary Examiner

F. SUSKO, Assistant Examiner

U.S. Cl. X.R.

308—191